US010843447B2

(12) United States Patent
Peiffer et al.

(10) Patent No.: US 10,843,447 B2
(45) Date of Patent: Nov. 24, 2020

(54) HEAT-SEALABLE AND PEELABLE POLYESTER FILM, USE THEREOF AND PROCESS FOR PRODUCTION THEREOF

(71) Applicant: Mitsubishi Polyester Film GmbH, Wiesbaden (DE)

(72) Inventors: Herbert Peiffer, Mainz (DE); Bodo Kuhmann, Runkel (DE); Stefan Bartsch, Mainz (DE); Martin Jesberger, Mainz (DE); Tobias Rentzsch, Bad Homburg (DE)

(73) Assignee: Mitsubishi Polyester Film GmbH, Wiesbaden (DE)

( * ) Notice: Subject to any disclaimer, the term of this patent is extended or adjusted under 35 U.S.C. 154(b) by 218 days.

(21) Appl. No.: 15/595,836

(22) Filed: May 15, 2017

(65) Prior Publication Data

US 2017/0341355 A1 Nov. 30, 2017

(30) Foreign Application Priority Data

May 27, 2016 (DE) .......... 10 2016 209 214

(51) Int. Cl.
    *B32B 27/36* (2006.01)
    *B29C 48/30* (2019.01)
    (Continued)

(52) U.S. Cl.
    CPC .............. *B32B 27/36* (2013.01); *B29C 48/30* (2019.02); *B29C 48/78* (2019.02); *B32B 27/08* (2013.01);
    (Continued)

(58) Field of Classification Search
    CPC ... B32B 27/36; B32B 27/08; B32B 2307/412; B32B 2307/31; B32B 2307/748;
    (Continued)

(56) References Cited

U.S. PATENT DOCUMENTS 4,252,885 A  2/1981  Mcgrail et al.
2004/0213967 A1*  10/2004  Peiffer ............... B32B 27/36
                                                        428/202
(Continued)

FOREIGN PATENT DOCUMENTS

DE      602 22 741 T2    7/2008
EP       0144878 A        6/1985
(Continued)

OTHER PUBLICATIONS

Ahlhaus, O.E.: Verpackung mit Kunststoffen [Packaging with plastics], Carl Hanser Verlag, p. 271, 1997, ISBN 3-446-17711-6. (abstract).

*Primary Examiner* — James C Yager
(74) *Attorney, Agent, or Firm* — PropPat, LLC; Cathy R. Moore

(57) ABSTRACT

A transparent, peelable polyester film is provided with clarity greater than 80% including a biaxially oriented polyester film as base layer (B) and an offline coated heat-sealable outer layer (A) that is peelable relative to ready-meal APET or RPET trays. The heat-sealable and peelable outer layer (A) includes from 85 to 99 wt % polyester and from 1 to 15 wt % other substances, the polyester including of from 25 to 95 mol % of units derived from at least one aromatic dicarboxylic acid and from 5 to 75 mol % of units derived from at least one aliphatic dicarboxylic acid. The polyester incorporates at least 10 mol % of units derived from diols having more than 2 carbon atoms. The mass of the dry outer layer (A) is from 1 to 5 g/m². Production processes for the foregoing film, and use thereof as scalable film for ready-meal trays is also provided.

22 Claims, 3 Drawing Sheets

(51) Int. Cl.
*B29C 48/78* (2019.01)
*B32B 27/08* (2006.01)
*B29K 67/00* (2006.01)
*B29L 7/00* (2006.01)
*B29L 31/00* (2006.01)

(52) U.S. Cl.
CPC ....... *B29K 2067/00* (2013.01); *B29L 2007/00* (2013.01); *B29L 2031/712* (2013.01); *B32B 2255/10* (2013.01); *B32B 2255/26* (2013.01); *B32B 2307/31* (2013.01); *B32B 2307/412* (2013.01); *B32B 2307/518* (2013.01); *B32B 2307/748* (2013.01); *B32B 2439/40* (2013.01); *B32B 2439/70* (2013.01); *Y10T 428/1352* (2015.01)

(58) Field of Classification Search
CPC .......... B32B 2307/518; B32B 2439/70; B32B 2439/40; B32B 2255/26; B32B 2255/10; B29C 48/78; B29C 48/30; B29C 48/08; B29K 2067/00; B29L 2007/00; B29L 2031/712; Y10T 428/1352
See application file for complete search history.

(56) References Cited

U.S. PATENT DOCUMENTS

2009/0017245 A1\* 1/2009 Forloni ................. B29C 55/023
    428/35.7
2013/0224411 A1    8/2013 Montcrieff et al.

FOREIGN PATENT DOCUMENTS

| EP | 0 379 190 A | 7/1990 |
| EP | 1 475 228 A2 | 11/2004 |
| JP | 2004/276541 A | 10/2004 |
| JP | 2009/202390 A | 9/2009 |
| WO | WO 94/13476 A1 | 6/1994 |
| WO | WO 94/13481 A1 | 6/1994 |
| WO | WO 02/026493 A1 | 4/2002 |
| WO | WO 02/059186 A1 | 8/2002 |
| WO | WO 03/061957 A2 | 7/2003 |
| WO | WO 2015/148685 A1 | 10/2015 |

\* cited by examiner

HEAT-SEALABLE AND PEELABLE POLYESTER FILM, USE THEREOF AND PROCESS FOR PRODUCTION THEREOF

CROSS-REFERENCE TO RELATED APPLICATIONS

This application claims priority to German Patent Application No. 10 2016 209 214.6 filed May 27, 2016 which is hereby incorporated herein by reference in its entirety.

FIELD OF THE INVENTION

The invention relates to a transparent, peelable polyester film comprised of a biaxially oriented base layer (B) and of at least one scalable and peelable outer layer (A) applied offline on said base layer (B).

The outer layer (A) is heat-sealable and features moderate to medium peelability, in particular in relation to ready-meal trays made of APET (APET=amorphous, transparent polyethylene terephthalate (PET)). The heat-sealable and peelable outer layer (A) comprises polyester based on aromatic and aliphatic acids and on aliphatic diols. The invention further relates to use of the film and a process for the production thereof.

BACKGROUND OF THE INVENTION

Transparent ready-meal trays made of APET which have a peelable seal using a film heat-sealed to the edge of the tray are used in particular for salads and fresh fruit. They are easy to use, and are therefore increasingly popular. This can be seen, by way of example from the fact that these products currently have double-digit percentage growth rates in Europe.

After preparation of salads or fresh fruit these are packed in ready-meal trays. A film is heat-sealed to the edge of the tray and seals the packaging and protects the ready-meal from exterior effects.

Heat-sealing of the amorphous and transparent ready-meal trays made of APET is achieved at sealing temperatures that are in essence from 110 to 150° C. Sealing time is generally significantly less than one second, in order to ensure cost-effectiveness. At sealing temperatures higher than 150° C. APET ready-meal trays lose dimensional stability and tend to warp.

Relatively high sealing temperatures (from >135 to 150° C.) can be used with high-specification ready-meal trays made of APET which is substantially free from regrind and has relatively high wall thicknesses (about 200 µm or more). Low sealing temperatures (<135° C.) are used in particular when ready-meal trays have relatively low wall thicknesses (about 200 µm or less) and comparatively high regrind content. The abbreviation RPET is often used for these latter trays.

Irrespective of the searing temperature used, a requirement placed upon the pack—also applicable after storage in a refrigerator or freezer—is that the film applied by sealing can be peeled from the ready-meal tray in a fully satisfactory manner by exerting a detectable force, without any resultant tearing. The term generally used for this behavior is "cold peel".

The film of the present invention can be heat-sealed to ready-meal trays made of APET and RPET, and is peelable. With a prescribed material and a prescribed total film thickness, the scalability and peelability of the film are determined mainly by the properties of the outer layer (A) sealed on the ready-meal tray.

The peelability of films can be determined relatively easily on a laboratory scale by using a tensile stress-strain tester (e.g. Zwick) (cf. FIG. 1). For this test, two strips of width 15 mm and length about 50 mm are cut out from the film (1) and from the ready-meal tray (2), and are sealed to one another. The layer (A) forms the scalable layer (3) of the film, and the internally situated layer of the ready-meal tray forms the scalable layer of the tray. The sealed strips are—as the figure shows—clamped into the tester clamps. The "angle" between the film clamped in the upper clamp and the tray strip is 180°. The tester clamps in this test are moved apart with a velocity of 200 mm/min, the intention here being to achieve full peeling of the film from the tray.

A film is considered peelable if the tensile force or the peel force (4) (in N/15 mm of film width) rises up to a certain value/plateau and then remains approximately constant over the distance over which the two strips have been sealed to one another (cf. FIG. 2). The film does not tear, but instead can be peeled as desired from the ready-meal tray by exerting a defined force.

The magnitude of the peel force is determined to a decisive extent by the polymers used in the heat-sealable layer (A) (cf. FIG. 3, polymer 1 in comparison with polymer 2). The magnitude of the peel force is also by way of example dependent on the heat-sealing temperature used and on the heat-sealing time, and also on the pressure between the two sealing jaws.

By way of example, peel force can rise sharply with heat-sealing temperature (cf. FIG. 3, polymer 1). As heat-sealing temperature increases there is an increasing risk here that the scalable layer loses its peel ability. This means that a film that is peelable when a low heat-sealing temperature is used loses this property when the heat-sealing temperature exceeds a certain level. This behavior is somewhat disadvantageous for the application, and has to be taken into account in the design of the scalable layer. The film must be amenable to heat-sealing within an adequately wide temperature range without any resultant loss of the desired peelability (cf. polymer 2 in FIG. 3). In practice, this temperature ranges generally from 110 to 150° C., preferably from 112 to 150° C. and particularly preferably from 115 to 150° C. Defined conditions are used here, in particular for sealing times (≤1 s) and applied pressures.

In the present invention, the heat-seal able and peelable layer (A) is applied to the polyester film (B) by means of offline technology in an additional processing step subsequent to film production. This method begins with production of a polyester film (B) with defined properties, by conventional processes. The resultant polyester film (B) is then coated "offline" with the heat-scalable and peelable layer (A) in a coating system in a further processing step.

This process begins by dissolving or dispersing, in an organic solvent, the heat-sealable and peelable polymer for the layer (A). The ready-to-use solution/dispersion is then applied to the film by way of a suitable application process (e.g. knife coater (doctor), screen roll or gravure roll (forward or reverse), polishing-roll process, die). The solvent is evaporated in a downstream drying oven, and the peelable polymer remains as solid layer on the film.

The present position is that various heat-sealable and peelable polyester films are marketed. These films differ in structure and in the composition of the outer layer (A), They have various applications in accordance with their peel properties.

By way of example, it is conventional to divide films according to application into easy-peel films, medium-peel films and strong-peel films. The magnitude of the respective peel force in accordance with FIG. 2 is an essential quantifiable feature for distinguishing between these films. A classification is provided here as follows

| | |
|---|---|
| Easy-peel | Peel force in the range of about 2 to 3N per 15 mm of strip width |
| Medium-peel | Peel force in the range of about 3 to 7N per 15 mm of strip width |
| Strong-peel | Peel force in the range above 7N per 15 mm of strip width |

An important criterion here is that when the film is peeled from the ready-meal tray no tearing, or incipient tearing, of the actual film is permitted. It must be possible to peel the film without loss of its integrity.

The market moreover places stringent optical requirements on the peel film, in particular in respect of low haze of <20% and high "clarity" of >80%, in order that the contents (e.g. the fresh salad or the fruit) can be clearly discerned. For the same reasons, it is desirable that the peel film has good antifogging action.

There are some known scalable and peelable PET films.

EP-A 0 379 190 describes a coextruded, biaxially oriented polyester film which comprises a supportive film layer made of polyester and at least one scalable film layer made of a polyester composition. The polymer for the scalable film layer comprises two different polyesters A and B, of which at least one (polyester B) comprises aliphatic dicarboxylic acids and/or aliphatic diols. Sealing energy measured between two opposite scalable film layers bonded to one another (=fin sealing) is more than 400 $g_{force}$·cm/15 mm (more than 4 N·cm/15 mm). The film features good peel properties (with plateau character in the peel diagram) in relation to itself (i.e. scalable film layer in relation to scalable film layer).

EP 1 475 228 B1 describes a coextruded, peelable, transparent and biaxially oriented polyester film with a base layer (B) and with at least one outer layer (A) applied on this base layer (B). The outer layer (A) is heat-sealable and features easy to medium peek in particular in relation to ready-meal trays made of APET/CPET. The outer layer (A) comprises polyester based on aromatic and aliphatic acids and on aliphatic diols. The outer layer (A) moreover comprises a defined concentration of a polyester-incompatible polymer (anti-PET polymer). The optical properties of the film, and its peel behavior in relation to ready-meal trays made of APET, require improvement.

WO 02/05186 A1 describes a process for the production of peelable films where the heat-sealable, peelable layer is applied in line to the polyester film. The process known as melt coating is used, where the longitudinally stretched film is preferably coated with the heat-sealable, peelable polymer. The heat-sealable, peelable polymer comprises polyester based on aromatic and aliphatic acids, and also based on aliphatic diols. The peelable polymers (copolymers) disclosed in the examples have glass transition temperatures below (minus) –10° C. These copolyesters are very soft, because they cannot be oriented in conventional roll stretching processes, and they tend to block in the roll. The thickness of the heat-sealable, peelable layer is less than 8 µm. The melt coating process known per se is delimited in the document technically, and by way of the viscosity of the melt, from the extrusion coating process known per se. The process has the disadvantage that only comparatively low-viscosity polymers (max. 50 Pa*s) with low molecular weight can be used. This results in disadvantageous peel properties of the film.

Peel behavior, in particular what is known as cold peel behavior, and "reworkability" (see explanation below), is disadvantageous in relation to all of the abovementioned inventions for sealing in relation to ready-meal trays made of APET. An effect known as "angels' hair" moreover occurs, in which peeling causes cobwebbing of the coating.

WO 2015/148685 A1 claims a coating mixture which has been dissolved in a solvent and which can be applied to a surface of a packaging film. The coating mixture here comprises the following constituents: a solvent and a heat-sealable polymer made of an amorphous or semicrystalline polyester or copolyester with glass transition temperature from –35 to 0° C. and with a "ring and ball" softening point of from 60 to 120° C., where this polymer is soluble in the solvents mentioned and moreover comprises antiblocking additives. If the mixture is coated on a packaging foil or film and is dried, it produces a heat-seal able coating which can be used in form-fill-seal machines at very low temperatures. Films of this invention have a tendency to seal to themselves when the wound films are stored (because of the low glass transition temperature), and cannot then be peeled undamaged from the wound film.

SUMMARY OF ADVANTAGEOUS EMBODIMENTS

It was an object of the present invention to provide a heat-sealable and peelable, biaxially oriented polyester film which has an offline coating and which features excellent sealing properties and peel properties in relation to ready-meal trays, in particular in relation to the ready-meal trays comprised of APET (amorphous) and RPET (regrind-containing), and which do not have the disadvantages of the prior art. They are in particular intended to have the following features:

Medium peel in relation to ready-meal trays made of APET and of RPET. Peel force is intended to be in the range from 3 to 7 N/15 mm.

The minimal sealing temperature of the heat-sealable and peelable layer in relation to ready-metal trays made of APET and of RPET is 110° C., and the maximal sealing temperature is generally about 160° C. (for a sealing time of 0.5 s and a defined applied pressure (see test methods below)).

The film can be produced cost-effectively. This also means by way of example that processes conventional in the industry can be used for the production of the base film (layer B).

The optical properties of the film are very good. This means by way of example low haze (below 20%), high clarity (greater than 80%) and high transparency (greater than 90%).

Another intention is that the film be amenable to processing on high-speed machines. At the same time, the intention is to avoid impairment of the characteristic properties of the biaxially oriented polyester films used. Among these are in particular the mechanical properties of the film. The modulus of elasticity of the coated film should be greater than 3000 N/mm$^2$, and the shrinkage of the coated film should not be greater than 2.5%.

The film is moreover intended to have good winding behavior and processability, in particular during and after coating, during printing or lamination, or during sealing of the coated film in relation to the ready-meal tray.

DETAILED DESCRIPTION OF ADVANTAGEOUS EMBODIMENTS OF THE INVENTION

Figure 1:
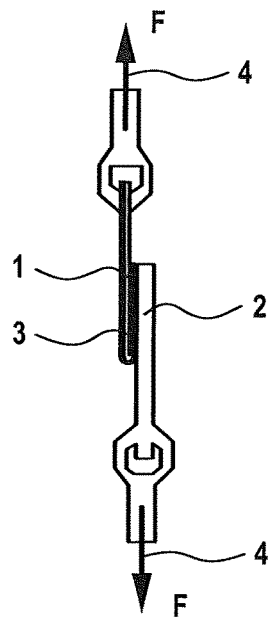
FIG. 1 is a schematic illustration of a tensile stress-strain tester and mode of operation for an exemplary sample.

The object is achieved via provision of a transparent, peelable polyester film with clarity greater than 80%, haze less than 20% and transparency greater than 90%, provided with an offline coating and comprising a biaxially oriented base layer (B) and, coated onto this, a heat-sealable outer layer (A) that is peelable in relation to ready-meal trays made of APET and of RPET, where the heat-sealable and peelable outer layer (A) is comprised of
 a) from 85 to 99% by weight of peel polyester and
 b) from 1 to 15% by weight of other substances, where
 c) the dicarboxylic-acid components of the peel polyester are composed of from 25 to 95 mol % of units derived from at least one aromatic dicarboxylic acid and from 5 to 75 mol % of units derived from at least one aliphatic dicarboxylic acid, where the sum of the units derived from these dicarboxylic acids gives 100 mol percent and
 d) the diol component of the peel polyester is comprised of at least 10 mol % of units derived from linear or branched diols having more than 2 carbon atoms, where the sum of all the diol components gives 100 mol percent;
 e) the mass of the dry outer layer (A) is from 1 to 5 g/m².

Unless otherwise stated, the expression "percent by weight" heretofore and hereinafter always refers to the respective layer or the respective system in the context of which the data is mentioned.

The outer layer (A) is comprised mainly of polyesters comprised of units derived from aromatic and aliphatic dicarboxylic acids.

The quantity present of the units derived from the aromatic dicarboxylic acids in the peel polyester is from 25 to 95 mol %, preferably from 40 to 90 mol %, particularly preferably from 50 to 88 mol %. The quantity present of the units derived from the aliphatic dicarboxylic acids in the peel polyester is from 5 to 75 mol %, preferably from 10 to 60 mol %, particularly preferably from 12 to 50 mol %, where the mol % data always give a total of 100%. Deviation from the above mentioned inventive ratios of aromatic and aliphatic dicarboxylic acids leads inter alia either to inadequate adhesion of the outer layer A on the base layer B (if the aromatic proportion of dicarboxylic acids is too small) or to a non-inventive peel force and/or minimal sealing temperature.

From 1 to 15% by weight of the material of the outer layer (A) is comprised of other substances, for example particles, additives, auxiliaries and/or other additional substances usually used in polyester film technology. Possible other additional substances used are antiblocking agents, lubricants, and in particular suitable antifogging agents, added in defined concentrations to the peel polyester or to the solution comprised of peel polyester, inclusive of other substances and solvents.

The heat-scalable and peelable outer layer (A) has characteristic features. Its minimal sealing temperature in relation to ready-meal trays made of APET and of RPET is not more than 110° C., preferably not more than 112° C. and particularly preferably not more than 115° C., and its seal seam strength (=peel force) in relation to ready-meal trays made of APET and of RPET is at least 3.0 N, preferably at least 3.1 N, particularly preferably at least 3.2 N (always based on 15 mm of film width). The maximal sealing temperature of the heat-sealable and peelable outer layer (A) in relation to ready-meal trays made of APET and of RPET is about 160° C., preferably 155° C. and particularly preferably 150° C., and in the entire sealing range here from 110 to 160° C. a film is obtained that is peelable in relation to ready-meal trays made of APET and of RPET.

Peel results for the preferred ranges stated above can also be described in numeric terms. In accordance with the above investigations, it is readily possible in the present invention to use the following relationship to relate the sealing temperature θ (in ° C.) to the peel force F tin N/15 mm):

$$0.018 \cdot \theta/°\text{C.} + 1.5 \le \text{peel force } F/N \text{ per } 15 \text{ mm} \le 0.03 \cdot \theta/°\text{C.} + 2.5$$

preferably $$0.018 \cdot \theta/°\text{C.} + 1.0 \le \text{peel force } F/N \text{ per } 15 \text{ mm} \le 0.03 \cdot \theta/°\text{C.} + 2.5.$$

Figure 4:
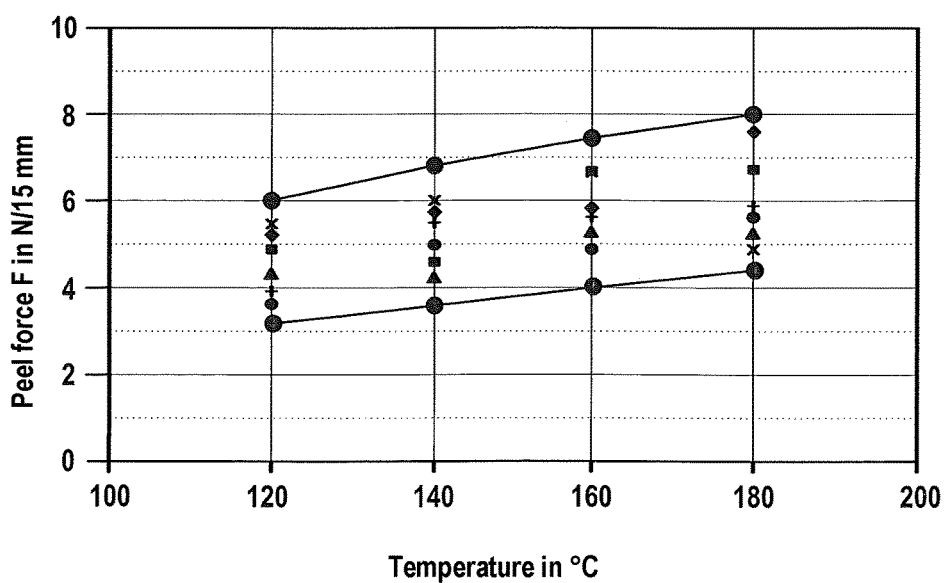
FIG. 4 is a graphical illustration of the relationship between the sealing temperature θ to the peel force F.

FIG. 4 provides a graphical illustration of this relationship.

Base Layer B=Biaxially Oriented Polyester Film

The film of the present invention comprises a base layer (B) which is a transparent biaxially oriented polyester film. At least one scalable and peelable outer layer (A) of the invention is applied thereto by means of offline coating technology.

The base layer B is a transparent single- or multilayer biaxially oriented polyester film, and is comprised of at least 80% by weight of thermoplastic polyester. Materials suitable for this purpose are polyesters made of ethylene glycol and terephthalic acid (=polyethylene terephthalate, PET), made of ethylene glycol and naphthalene-2,6-dicarboxylic acid (=polyethylene 2,6-naphthalate, PEN), made of 1,4-bishydroxymethylcyclohexane and terephthalic acid (=poly-1,4-cyclohexanedimethylene terephthalate, PCDT), and also made of ethylene glycol, naphthalene-2,6-dicarboxylic acid and biphenyl-4,4'-dicarboxylic acid polyethylene 2,6-naphthalate bibenzoate, PENBB). Preference is given to polyesters which comprise ethylene units and which—based on the dicarboxylate units—are comprised of at least 90 mol %, particularly at least 95 mol %, of terephthalate units or 2,6-naphthalate units. The remaining monomer units derive from other dicarboxylic acids and, respectively, diols. It is advantageously also possible to use, for the base layer (B), copolymers or mixtures or blends made of the homo- and/or copolymers mentioned; (in the case of the quantity stated for the dicarboxylic acids, the total quantity of all of the dicarboxylic acids is 100 mol %; analogously, the total quantity of all of the diols is also 100 mol %).

Suitable other aromatic dicarboxylic acids are preferably benzenedicarboxylic acids, naphthalenedicarboxylic acids (for example naphthalene-1,4- or 1,6-dicarboxylic acid), biphenyl-x,x'-dicarboxylic acids (in particular biphenyl-4,4'-dicarboxylic acid), diphenylacetylene-x,x'-dicarboxylic acids (in particular diphenylacetylene-4,4'-dicarboxylic acid) and stilbene-x,x'-dicarboxylic acids. Among the cycloaliphatic dicarboxylic acids mention may be made of cyclohexanedicarboxylic acids (in particular cyclohexane-1,4-dicarboxylic acid). Among the aliphatic dicarboxylic acids the ($C_3$-$C_{19}$) alkane diacids have particular suitability, where the alkane moiety can be straight-chain or branched.

Examples of suitable other aliphatic diols are diethylene glycol, triethylene glycol, aliphatic glycols of the general formula HO—$(CH_2)_n$—OH, where n is an integer from 3 to 6 (in particular propane-1,3-diol, butane-1,4-diol, pentane-1,5-diol and hexane-1,6-diol) and branched aliphatic glycols having up to 6 carbon atoms, and cycloaliphatic, optionally heteroatom-containing diols having one or more rings. Among the cycloaliphatic diols mention may be made of cyclohexanediols (in particular cyclohexane-1,4-diol). Suitable other aromatic diols have by way of example the formula HO—$C_6H_4$—X—$C_6H_4$—OH, where X is —$CH_2$—, —$C(CH_3)_2$—, —$C(CF_3)_2$—, —O—, —S— or —$SO_2$—. Bisphenols of the formula HO—$C_6H_4$—$C_6H_4$—OH are also suitable.

The base layer (B) is particularly advantageously a biaxially oriented polyester film comprised of a copolyester whose dicarboxylic acid components are based on terephthalic-acid-derived units and on a small quantity (<5 mol %) of isophthalic-acid-derived units. In this case the film is particularly easy to produce and has particularly good optical properties. The base layer (B) then in essence comprises a polyester copolymer comprised mainly of terephthalic acid and isophthalic acid units and of ethylene glycol units (>97 mol % of diol units).

The polyesters can be produced by the transesterification process. This starts from dicarboxylic esters and diols, which are reacted with the conventional transesterification catalysts, for example salts of zinc, of calcium, of lithium and of manganese. The intermediates are then polycondensed in the presence of well known polycondensation catalysts, for example antimony trioxide, titanium oxide or esters, or else germanium compounds. The production process can equally well proceed by the direct esterification process in the presence of polycondensation catalysts. This starts directly from the dicarboxylic acids and the diols.

It has proven particularly advantageous to polycondense the intermediates in the presence of titanium dioxide or germanium compounds and, respectively to carry out the direct esterification process in the presence of polycondensation catalysts such as titanium dioxide or germanium compounds. The resultant biaxially oriented polyester film is therefore antimony-free, or at least has low antimony content. In the particularly preferred case, a desirable biaxially oriented polyester film comprises no antimony and can therefore be used in packaging applications where the film has direct contact with food.

Heat-Sealable and Peelable Outer Layer (A)

The film of the present invention is comprised of at least two layers. It is then comprised of the base layer (B) explained above and of the heat-sealable and peelable outer layer (A) of the invention applied thereon via offline coating technology.

The scalable and peelable outer layer (A) applied to the biaxially oriented polyester film=base layer (B) via offline coding technology is comprised mainly, i.e. of at least about 85% by weight of a peel polyester.

The peel polyester in the invention is comprised of aromatic and aliphatic dicarboxylic acids and of aliphatic diols. The peel polyesters of the invention can be blends of homopolyesters, or can be copolyesters, or else mixtures of co- and homopolyesters, preference being given to blends of homo- and copolyesters and blends of various copolyesters based on aromatic and aliphatic dicarboxylic acids and on aliphatic diols.

Examples of the aromatic dicarboxylic acids that can be used in the invention and that can be present in the form of derived units in the peel polyester are terephthalic acid, isophthalic acid, phthalic acid and 2,6-naphthalenedicarboxylic acid. Preference is given to terephthalic acid and isophthalic acid.

Examples of the aliphatic dicarboxylic acids that can be used in the invention and that can be present in the form of derived units in the peel polyester are succinic acid, glutaric acid, adipic acid, pimelic acid, suberic acid, azelaic acid and sebacic acid. Preference is given to azelaic acid, sebacic acid and adipic acid.

Examples of the aliphatic diols that can be used in the invention and that can be present in the form of derived units in the peel polyester are ethylene glycol, 1,3-propanediol, 1,3-butanediol, 1,4-butanediol, 1,5-pentanediol, 2,2-dimethyl-1,3-propanediol, diethylene glycol, triethylene glycol and 1,4-cyclohexanedimethanol and neopentyl glycol. Preference is given to ethylene glycol, diethylene glycol, 1,2-propanediol, butanediol and neopentyl glycol.

The peel polyester generally includes the following "dicarboxylic-acid-derived units" and "diol-derived units", based in each case on the entire quantity of dicarboxylic-acid-based and, respectively, diol-based repeat units;

from 25 to 85 mol %, preferably from 30 to 80 mol % and particularly preferably from 35 to 70 mol %, of terephthalate, from 5 to 50 mol %, preferably from 10 to 45 mol % and particularly preferably from 15 to 40 mol %, of isophthalate, from 5 to 50 mol %, preferably from 5 to 40 mol % and particularly preferably from 5 to 30 mol %, of adipate, from 0 to 30 mol %, preferably from 0 to 20 mol % and particularly preferably from 0 to 10 mol %, of azelate, from 5 to 50 mol %, preferably from 5 to 40 mol % and particularly preferably from 5 to 30 mol %, of sebacate, more than 10 mol %, preferably more than 11 mol % and particularly preferably more than 12 mol %, of ethylene glycol quantities greater than 10 mol % of one or more diols selected from the group of $C_3$ to $C_7$-diols, di-, tri- and tetra-$C_2$ to $C_4$-alkylene glycols, and also combinations thereof. The expression "$C_3$ to $C_7$-diols in particular means: propylene glycol, butylene glycol and neopentyl glycol. The expression "di- to tetraalkylene glycols in particular means: diethylene glycol, triethylene glycol or dipropylene glycol.

The glass transition temperature of the peel polyester of the heat-sealable and peelable outer layer (A) in the invention is from 0 to 30° C. The glass transition temperature is preferably from 0 to 27° C. and particularly preferably from 0 to 25° C. If the glass transition temperature of the polyester is below 0° C., the film is not amenable to reliable further processing. In this case, the outer layer (A) is highly susceptible to adhesion in relation to itself and in relation to the other side of the peel film, and it therefore blocks on winding and then cannot be further processed. This adhesion in the wound film is attended by frequent film break-offs, in particular during unwinding of the film. If on the other hand, glass transition temperature is above 30° C., the outer layer (A) no longer provides sealing and in particular the desired peeling at the low temperatures of the invention (minimal sealing temperature 110° C.) The film moreover has increased susceptibility to tearing or break-off during peeling from the ready-meal tray, and this is undesirable. The sealing temperatures of the invention are achieved via compliance with the composition of the invention for the peel polyester (see above).

The SV value of the peel polyester of the heat-sealable and peelable outer layer (A) in the invention is from 200 to 2000. The SV value is preferably from 250 to 1900 and particularly preferably from 300 to 1900. If the SV value is less than 200, it is then impossible to comply with the required seal seam strength of the outer layer (A) of from more than 3 to 7 N/15 mm in the temperature range of the invention in relation to ready-meal trays made of APET and of RPET. Peel force is too small. If, on the other hand, the SV value is greater than 2000, the polyester is too viscous and by way of example is difficult to dissolve or to disperse in the solvent. The SV value must, be determined here by a method based on that described in the experimental section.

The mass of the dry outer layer (A) of the film of the invention is moreover in the range from 1 to 5 g/m$^2$, preferably in the range from 1.1 to 4.8 g/m$^2$ and particularly preferably in the range from 1.2 to 4.6 g/m$^2$. If the application weight of the outer layer (A) is more than 5 g/m$^2$, peel force increases significantly and is no longer within the range of the invention. The peel behavior of the film is moreover impaired; tearing of the film occurs to an increased extent during peeling from the ready-meal tray. If in contrast, the thickness of the outer layer (A) is less than 1 g/m$^2$, the film is then neither heat-sealable within the temperature range of the invention nor peelable.

Antiblocking Agent in the Sealable Layer (A)

It is advantageous to carry out further modification of the heat-sealable and peelable outer layer (A) in order to improve handling of the film and processability of the film (winding onto the roll and unwinding therefrom) on the respective machines (printing and sealing), and in particular also in order to improve the behavior of the film during peeling from the ready-meal tray.

This is most effectively achieved with the aid of suitable antiblocking agents which are optionally added to the scalable layer, and specifically in quantities that prevent blocking of the film in particular on the roll, improve the behavior of the film during peeling from the ready-meal tray, and further optimize the entire processing behavior of the film.

It has proven advantageous for the outer layer (A) to include particles of a defined size in a defined concentration and optionally in a defined distribution. It is also possible to add, to the outer layer (A), mixtures of two or more different particle systems, or mixtures of particle systems of the same chemical composition but of different particle size.

Conventional antiblocking agents (also termed "pigments" or "particles") are inorganic and/or organic particles, for example calcium carbonate, amorphous silica, talc, magnesium carbonate, barium carbonate, calcium sulfate, barium sulfate, lithium phosphate, calcium phosphate, magnesium phosphate, aluminum oxide, lithium, fluoride, or salts of calcium, of barium, of zinc or of manganese of the dicarboxylic acids used in the outer layer A in derived form, carbon black, titanium dioxide, kaolin, or crosslinked polystyrene particles or crosslinked polymer particles based on acrylic acid derivatives.

The particles, in the respectively advantageous concentrations, by way of example in the form of glycolic dispersion, can be added to the outer layer (A) during production of the peel polyester (i.e. during polycondensation of the peel polyester) or to the solvent-based precursor system for the outer layer A during lacquer production (after polycondensation).

Particles preferred in the invention are synthetic, amorphous $SiO_2$ particles in colloidal form. These particles become bound very effectively into the polymer matrix, and produce only a small number of vacuoles (cavities). Vacuoles can be produced by way of example during drying of the lacquer; they generally increase haze, and therefore have little suitability for the present invention. Reference is made to the prior art for the production of the $SiO_2$ particles; the process is disclosed in detail by way of example in EP 1 475 228 B1.

It has proven advantageous to use particles with median particle diameter $d_{50}$ from 2.0 to 8 µm, preferably from 2.5 to 7 µm and particularly preferably from 3.0 to 6 µm. When particles with diameter below 2.0 µm are used, there is no favorable effect of the particles by way of example on winding of the film onto the roll or unwinding therefrom, and on the behavior of the film during peeling from the ready-meal tray. In this case, the film is again susceptible by way of example to tearing or tear-propagation during unwinding, and this is undesirable. Particles with diameter greater than 8 µm generally cause problems during lacquer application and processing (blocked filters).

In a preferred embodiment, the diameter ($d_{50}$) of the particles in the heat-sealable and peelable outer layer (A) is greater than the thickness of said layer. It has proven to be advantageous to select a diameter/layer-thickness ratio of at least 1.2, preferably at least 1.3 and particularly preferably at least 1.4. In these cases, the particles have a particularly favorable effect in particular on the unwinding behavior of the film.

For provision of the desired peel properties, it has proven advantageous for the heat-sealable and peelable outer layer (A) to comprise particles in a concentration of from 0.5 to 10% by weight. The concentration of the particles is preferably from 0.7 to 8.0% by weight and particularly preferably from 1.0 to 6.0% by weight. If in contrast, the outer layer (A) of the film comprises particles in a concentration of less than 0.5% by weight, there is then no favorable effect on winding of the film. If, in contrast, the outer layer (A) of the film comprises particles in a concentration of more than 10% by weight, the haze of the film becomes too great.

It has moreover proven to be advantageous to adjust the roughness of the heat-sealable and peelable outer layer (A) via appropriate use of the abovementioned particles in such a way that its $R_a$ value is greater than 60 nm. An $R_a$ value greater than 80 nm is preferred, and an $R_a$ value greater than 100 nm is particularly preferred. On the other hand, the $R_a$ value should not exceed 300 nm, preferably 250 nm, and in particular 200 nm. This characteristic can be controlled very effectively by way of a suitable selection of particle diameters and particle concentration, and variation of the layer thickness of the outer layer (A).

In order to achieve the desired low haze and high clarity, gloss and transparency of the peel film, which is also intended to be maintained during storage of the finished sealed pack, e.g. in the supermarket prior to use, it is particularly advantageous for the outer layer (A) to have good antifogging properties. To this end, the outer layer (A) comprises suitable antifogging agents in the desired concentration. Examples of suitable antifogging agents are surfactants, where this term means molecules comprised of a hydrophobic and a hydrophilic moiety, therefore being amphiphilic. The surfactants here can be of nonionic, cationic, anionic or zwitterionic type. It is moreover possible to use polymeric surfactants or protective colloids as antifogging agents.

Particularly suitable materials are anionic surfactants preferably selected from the group of the alkyl sulfates, alkylbenzene sulfates, alkyl ether sulfates or sulfosuccinic esters. Very particular preference is given to surfactants selected from the group of the sulfosuccinic esters (sodium dioctyl sulfosuccinate), e.g. sodium diethylhexyl sulfosuccinate.

The concentration used in the outer layer (A) of the antifogging agent is from 0.01 to 5% by weight, preferably from 0.03 to 3.0% by weight, where the concentration of the surfactant depends in particular on the desired antifogging properties. Good antifogging/anticondensation properties of the surface of the outer layer (A) are achieved when no formation of fine droplets is observed on the surface and at the same time the coating has good resistance to removal by washing.

An essential requirement for good anticondensation properties is high surface tension, or a small contact angle of the surface of outer layer (A). Anticondensation properties are adequate if the surface tension of the outer layer (A) is at least 55 mN/m, preferably at least 58 mN/m and particularly preferably at least 61 mN/m.

In the offline coating process, the outer layer (A) in the form of a liquid coating composition, i.e. in the form of lacquer, is applied to the base layer (B). In a method that has proven advantageous for the production of the lacquer, the "solid components", for example the peel polymer(s), and also the content of other substances, e.g. the antiblocking agents and/or antifogging agents, are dissolved in an organic solvent, or at least homogeneously dispersed. In a preferred embodiment, a solvent mixture made of ethyl acetate (EA) and methyl ethyl ketone (MEK) is used as continuous phase during production of the lacquer. The proportion of MEK here is up to 50% by weight, preferably up to 40% by weight and particularly preferably up to 30% by weight, based on the entire composition of the solvent mixture, in a particularly preferred embodiment, the continuous phase charged is comprised exclusively of EA.

Use of the abovementioned solvents particularly facilitates achievement of criteria and threshold values required by food legislation, thus facilitating the inventive use of the films coated with the lacquer in food packaging. Use of EA moreover reduces solvent-based costs of production and of disposal, thus permitting particularly cost-effective production of the film of the invention.

The "solids content" of the lacquer, or the content of substances other than the solvent in the lacquer, is at least 20% by weight, preferably at least 23% by weight and ideally at least 26% by weight. The upper limits are set via process conditions, and relate to the processability of the lacquer, if solids content is below 20% by weight, it is impossible to achieve uniform cover of the film by the lacquer, and uncoated film sections and drying phenomena (coffee-stain effect) sometimes occur.

In order to achieve good wetting of the polyester film by the solution and good adhesion of the polyester on the biaxially oriented polyester film, it is advantageous, before coating, to begin by corona-pretreating the surface of the polyester film.

Antiblocking Agent in Base Layer (B)

In order to achieve a further improvement in the processing behavior of the film of the present invention, it is advantageous that particles are likewise incorporated into the base layer (B) (i.e. the biaxially oriented polyester film). It has proven advantageous here to comply with the following conditions:

a) The median particle diameter $d_{50}$ of the particles should be from 1.5 to 6 µm. It has proven to be particularly advantageous here to use particles with median particle diameter $d_{50}$ from 2.0 to 5 µm and particularly from 2.5 to 4 µm.

b) The particle should be present in a concentration of from 0.1 to 5% by weight. The concentration of the particles is preferably from 0.12 to 4% by weight and particularly preferably from 0.15 to 3% by weight.

The base layer (B), i.e. the biaxially oriented polyester film of the peel film of the invention, can itself be comprised of one or more layers. A three-layer structure of the biaxially oriented polyester film B, using a structure B'B"B' (or B'B"B'") has proven to be particularly advantageous for achieving the abovementioned properties of the peel film, in particular the very good optical properties required. The quantity of particles in the base layer B" of this three-layer film should be set lower here than in the two outer layers B' (or B' and B'"), which are preferably structurally identical, or else can also be different (B' and B'").

In the case of three-layer biaxially oriented polyester film of the type mentioned (B'B"B') or (B'B"B'"), the intention is that the quantity of the particles in the base layer (B") is from 0 to 2.0% by weight, preferably from 0 to 1.5% by weight, in particular from 0 to 1.0% by weight. It has proven particularly advantageous to incorporate, into the base layer, only particles that pass into the film by way of the regrind (recyclate) of the same material. The optical properties of the film, in particular the haze of the film, are then particularly good.

The thickness of the two outer layers B' (or B' and B'") can be identical or different; the thickness of these is generally respectively from 0.5 to 5 µm.

It has proven to be advantageous for the processing of the polymers, and in particular for achieving the desired very good optical properties of the peel film, to select the polymers for the base layer (B"), and those for the other layers (B' and/or B'") of the biaxially oriented polyester film in such a way that the viscosities of the respective polymer melts do not differ excessively. If this is not the case, it is likely that the finished film will exhibit additional elevations/projections, problematic flow effects, or streaking. A modified solution viscosity (SV value or "solution viscosity") is used to describe the viscosity ranges of the two melts.

SV values for commercially available polyethylene terephthalates suitable for the production of biaxially oriented polyester films are in the range from 600 to 1000. In order to ensure fully satisfactory quality of the film for the purposes of the present invention, the SV value of the polymers for the layers B' (or B' and B'") should be in the range from 500 to 1200, preferably in the range from 550 to 1150, with particular preference in the range from 600 to 1000. The SV values of the polymer melts for base layers and the other layers should differ by no more than 200 units, preferably no more than 150 units, and in particular no more than 100 units. In all of the cases mentioned, it is moreover very advantageous for the present invention for the viscosities of the two layers B' and/or B''' to be lower than the viscosity of the base layer (B'').

The biaxially oriented polyester film (=base layer (B)) can also comprise conventional additives, for example stabilizers (UV, hydrolysis), flame-retardant substances or fillers. They are advantageously added to the polymer or polymer mixture before melting in the extruder.

The total thickness of the peel film of the invention can vary within defined limits. It is from 3 to 200 µm, in particular from 4 to 150 µm, preferably from 5 to 100 µm, where the layer (B) preferably makes up a proportion of from 45 to 97% of the total thickness.

Process

The present invention also provides a process for the production of peel film with a transparent, biaxially oriented polyester film as base layer (B or B'B''B' or B'B''B'''), and with a scalable and peelable outer layer (A) applied via offline coating.

The transparent, biaxially oriented polyester film=base layer (B) or base layer with layer structure (B'B''B' or B'B''B''') is produced by the conventional process (e.g. the coextrusion process). Preference is given in the invention to production of a polyester film with the layer structure (B'B''B' or B'B''B'''), with which it is possible to achieve particularly effective production of a film with high gloss and with low haze. In the case of this preferred three-layer film structure with a base layer (B'') and the two outer layers (B') or the outer layers (B' and B'''), particle concentration in the base layer (B'') is preferably lower than that in the two outer layers (B') or in the outer layers (B' and B'''). Particle concentration in the base layer (B'') should be selected in such a way that it has a favorable effect on the haze and gloss of the film. In the case of a three-layer film of the type mentioned, particle concentration in the base layer (B'') will be from 0 to 0.06% by weight, preferably from 0 to 0.03% by weight and in particular from 0 to 0.01% by weight. The diameter of the particles used is in principle not subject to any restriction, but particular preference is given to particles with median diameter ($d_{50}$) greater than 1 µm. The concentration of the particles in the outer layers is from 0.01 to 0.2% by weight, preferably from 0.02 to 0.16% by weight and particularly preferably from 0.030 to 0.12% by weight, and depends in essence on the size of the particles used.

In the coextrusion process, by way of example after extrusion of the respective melts in separate extruders, these are shaped in a coextrusion die to give flat melt films, and are mutually superposed in layers. The multilayer film is then drawn off and hardened with the aid of a chill roll and optionally other rolls. In the interests of a technical aspect of the process (mixing of the various components), it has proven to be particularly advantageous here to use a twin-screw extruder with one or more devolatilization capability/capabilities for extrusion of the polymers at least for the outer layers (B') or tor the outer layers (B' and B'''). The resultant film has fully satisfactory optical properties, e.g. exhibits no cloud effects or streaking. This film is particularly amenable to effective further processing, and in particular is amenable to very effective printing.

The biaxial stretching of the film is generally carried out sequentially. Sequential stretching is preferably carried out first in longitudinal direction and then in transverse direction. The stretching in longitudinal direction can be carried out with the aid of two rolls running at different speeds corresponding to the desired stretching ratio. An appropriate tenter frame is generally used for transverse stretching.

The temperature at which stretching is carried out can vary relatively widely, and depends on the desired properties of the film. Stretching in longitudinal direction (machine direction orientation=MDO) is generally carried out in the temperature range from 60 to 130° C. (heating temperatures from 60 to 130° C.), and stretching in transverse direction (transverse direction orientation=TDO) is generally carried out in the temperature range from 90° C. (start of stretching) to 140° C. (end of stretching). The longitudinal stretching ratio is in the range from 2.0:1 to 5.5:1, preferably from 2.3:1 to 5.0:1. The transverse stretching ratio is generally in the range from 2.4:1 to 5.0:1, preferably from 2.6:1 to 4.5:1.

Before transverse stretching, one or both surfaces of the film can be coated inline by the processes known per se. The inline coating can by way of example lead to improved adhesion between a metal layer or a print ink and the film, to improvement of antistatic behavior or of processing behavior, or else to further improvement of barrier properties of the film. These layers are then preferably applied to that surface of the biaxially oriented film that is not coaled with the scalable and peelable polyester. It is optionally possible, e.g. in order to improve adhesion to the outer layer (A), to use the above process for inline coating onto that surface of the film that is offline coated with the peel-coating composition.

It is possible in the invention by way of example that the film is coated with a functional coating on the surface that is not to be coated offline, the resultant thickness of the functional coating on the finished film being from 5 to 200 mm preferably from 20 to 150 nm, in particular from 30 to 80 nm. Particular preference is given to application by means of the "Reverse gravure-roll coating" process, which can achieve extremely homogeneous application of the coatings in layer thicknesses up to 200 nm. Preference is likewise given to application by the Meyer Rod process, which can achieve thicker coatings.

The coatings applied preferably take the form of solutions, suspensions or dispersions, particularly preferably of an aqueous solution, suspension or dispersion. The coatings provide an additional function to the film surface; by way of example, the film thus becomes printable, metalizable, sterilizable or antistatic, or by way of example has an improved aroma barrier, or can adhere to materials which otherwise would not adhere to the film surface.

Examples of substances/compositions which provide additional functionality are: acrylates as described by way of example in WO94/13476, ethylene-vinyl alcohols, PVDC, water glass ($Na_2SiO_4$), hydrophilic polyesters (PET/IPA polyesters comprising the sodium salt of 5-sulfoisophthalic acid, as described by way of example in EP-A-0144878, U.S. Pat. No. 4,252,885 or EP-A-0296620), polyvinyl acetates as described by way of example in WO94/13481, polyurethanes, the alkali metal or alkaline earth metal salts of $C_{10}C_{18}$-fatty acids, butadiene copolymers with acrylonitrile or methyl methacrylate, methacrylic acid and esters thereof.

The substances/compositions mentioned are applied in the form of dilute solution, emulsion or dispersion, preferably in the form of aqueous solution, emulsion or dispersion, to one or both film surfaces, and then the solvent is evaporated. If the coatings are applied inline before transverse stretching, the heat treatment during transverse stretching and subsequent heat-setting is usually sufficient to evaporate the solvent and dry the coating. The layer thicknesses of the dried coatings are then generally from 5 to 200 nm, preferably from 20 to 150 nm, in particular from 30 to 100 nm.

A preferred embodiment of the invention uses a copolyester coating to achieve better adhesion. The preferred coating copolyesters are produced via polycondensation of (alpha) isophthalic acid, (beta) an aliphatic dicarboxylic acid with the formula

HOOC(CH$_2$)$_n$COOH, where n is in the range from 1 to 11, (gamma) a sulfo monomer comprising an alkali metal sulfonate group on the aromatic moiety of an aromatic dicarboxylic acid, and (delta) at least one aliphatic or cycloaliphatic alkylene glycol having about 2 to 11, preferably 2 to 8, particularly preferably 2 to 6, carbon atoms. The intention is that the total number of acid equivalents present, on a molar basis, in essence corresponds to the total number of glycol equivalents present.

It has been found that the relative proportions of the components alpha, beta, gamma and delta used for the production of the preferred copolyester coatings are of decisive importance for achieving a coated film with satisfactory adhesion: the quantity of, by way of example, isophthalic acid (component alpha) present as acid component should preferably be at least about 65 mol %. Component alpha is preferably pure isophthalic acid, the quantity present of which is about 70 to 95 mol %. For component beta, any acid with the formula mentioned provides satisfactory results, preference being given to adipic acid, azelaic acid, sebacic acid, malonaic acid, succinic acid, glutaric acid and mixtures of these acids. When component beta is present in the composition, the desired quantity within the stated range is preferably from 1 to 20 mol %, based on the acid components of the copolyester. The quantity present of the monomer forming component gamma of the preferred copolyester coating should preferably be at least 5 mol % in this system in order that the composition is water-dispersible. The quantity of monomer of component gamma is particularly preferably about 6.5 to 12 mol %. The quantity present of the glycol component (delta) is approximately stochiometric.

As described above, the coating mentioned can be applied to that surface of the film that is not further coated offline. However, it can also optionally be applied to the surface that is coated offline with the peel-coating composition. It then contributes to improved adhesion to the outer layer (A).

Another preferred embodiment of the invention uses an acrylate coating to achieve better adhesion. The acrylic copolymers preferably used consist essentially of at least 50% by weight of one or more polymerized acrylic and/or methacrylic monomers and from 1 to 15% by weight of a copolymerizable comonomer which is capable, in copolymerized condition with exposure to elevated temperature, if necessary without addition of any separate resin-forming crosslinking agent, of forming intermolecular crosslinks.

The quantity preferably present of the acrylic component of the adhesion-promoter copolymers is from 50 to 99% by weight, and said component is preferably comprised of an ester of methacrylic acid, in particular an alkyl ester whose alkyl group comprises up to 10 carbon atoms, examples being the methyl, ethyl, n-propyl, isopropyl, n-butyl, isobutyl, tert-butyl, hexyl, 2-ethylhexyl, heptyl and n-octyl group. When acrylic copolymers derived from a lower alkyl acrylate (C1 to C4), in particular ethyl acrylate, are used together with a lower alkyl methacrylate they give particularly good adhesion between the polyester film and reprographic coatings and matt coatings applied thereto. It is very particularly preferable to use adhesion-promoter copolymers of an alkyl acrylate, e.g. ethyl acrylate or butyl acrylate, together with an alkyl methacrylate, e.g. methyl methacrylate, in particular in equal molar proportions and in a total quantity of from 70 to 95% by weight. The proportion present of the acrylate comonomer of these acrylic/methacrylic combinations is preferably from 15 to 65 mol %, and the proportion present of the methacrylate comonomer is preferably greater by from generally 5 to 20 mol % than the proportion of the acrylate comonomer. The proportion of the methacrylate present in the combination is preferably from 35 to 85 mol %.

In order to increase solvent resistance, it is optionally possible to use comonomers suitable for developing crosslinks, for example N-methylolacrylamide, N-methylolmethacrylamide, and the corresponding ethers; epoxy materials, for example glycidyl acrylate, glycidyl methacrylate and allyl glycidyl ether; monomers comprising carboxy groups, for example crotonic acid, itaconic acid or acrylic acid; anhydrides, for example maleic anhydride or itaconic anhydride; monomers comprising hydroxy groups, for example allyl alcohol and hydroxyethyl acrylate, hydroxypropyl acrylate, hydroxyethyl methacrylate or hydroxypropyl methacrylate; amides, tor example acrylamide, methacrylamide or maleamide, and isocyanates, for example vinyl isocyanate or allyl isocyanate. Among the abovementioned crosslinking comonomers, preference is given to N-methylolacrylamide and N-methylolmethacrylamide, and specifically primarily because when copolymer chains comprising one of these monomers are exposed to elevated temperatures they are capable of condensing with one another and thus forming the desired intermolecular crosslinks. However, the optionally desired solvent resistance of the preferred acrylate coating can also be achieved through the presence of a foreign crosslinking agent, for example a melamine- or urea-formaldehyde-condensation product. If no solvent resistance is required, crosslinking agents can be omitted.

The preferred acrylate coating can be applied to one or both sides of the film. However, it is also possible to provide the acrylate coating only to one side of the film and to apply another coating to the opposite side. The coating formulation can comprise known additives, e.g. antistatic agents, wetting agents, surfactants, pH regulators, antioxidants, dyes, pigments, and antiblocking agents, for example colloidal SiO$_2$, etc. It is normally useful to incorporate a surfactant in order to increase the ability of the aqueous coating to wet the supportive polyester film.

Another preferred embodiment of the invention uses a water-soluble or hydrophilic coating to achieve better adhesion to hydrophilic layers or printing inks. Three mixtures can be used to achieve the preferred hydrophilic coating:

1. A mixture of an aromatic copolyester (I-1) having a water-dispersible functional group with a polyvinyl alcohol (II-1), 2. A mixture of an aromatic copolyester (I-2) having a water-dispersible functional group with a polyglycerol polyglycidyl ether (II-2), or 3. A mixture of an aqueous polyurethane (I-3) with a polyvinyl alcohol (II-3).

The aromatic copolyesters (I-1 and I-2) are produced from aromatic dicarboxylic acids, for example terephthalic acid, 2,6-naphthalenedicarboxylic acid or isophthalic acid, optionally branched or condensed aliphatic diols, for example ethylene glycol, diethylene glycol, 2-methylpropanol or 2,2-dimethylpropanol, and also an ester-forming compound which bears a water-dispersible functional group. Examples of the functional groups are: hydroxy, carboxy, sulfonic acid and phosphoric acid groups and salts thereof. Preference is given to salts of sulfonic acid and of carboxylic acid. Any polyvinyl alcohol that is water-soluble and can be produced by standard polymerization techniques can be used as polyvinyl alcohol component (II-1 and II-3). These polyvinyl alcohols are generally produced by hydrolysis of polyvinyl acetates. The degree of hydrolysis should preferably be at least 70%, but more preferably from 80 to 99.9%. Reaction products of glycerol and epichlorohydrin with molecular weights about 250 to 1200 are used as polyglycerol polyglycidyl ether (II-2). The aqueous polyurethane (I-3) is produced from a polyol, for example polyester having terminal glycol groups, polyoxyethylene glycol, polyoxypropylene glycol, polyoxytetramethylene glycol or acrylic polyols, and a diisocyanate, for example xylene diisocyanate, hexamethylene diisocyanate, dicyclohexylmethane 4,4'-diisocyanate, toluidine diisocyanate, phenylene diisocyanate, diphenylmethane 4,4'-diisocyanate or naphthalene 1,5-diisocyanate.

The preferred copolyester coatings, acrylate coatings and hydrophilic coatings can moreover comprise other known additions, e.g. antistatic agents, wetting agents, surfactants, pH regulators, antioxidants, dyes, pigments and antiblocking agents, for example colloidal $SiO_2$, etc.

In the heat-setting that follows, the film is kept at a temperature of from 150 to 250° C. for a period of about 0.1 to 10 s. The film is then wound up in conventional manner.

The final production of the heat-sealable and peelable film of the invention takes place offline in a further, independent step. In this, conventional coating technology is used to apply the peel-coating composition in the desired thickness in liquid form to the base film.

A typical coating system—also termed lacquering system—consists essentially of an unwind, a corona-pretreatment unit, one or more applicator units, a dryer and/or, by way of a polishing roll, a windup. The coating is usually applied by way of a gravure roll or by way of a polishing roll running in the same direction as the web (forward gravure). Operating width is usually more than 1000 mm, and machine speed is usually more than 150 m/min. There are of course also other conventional coating technologies, for example knife coater (doctor), Meyer Rod, flow coater, etc.

Figure 5:
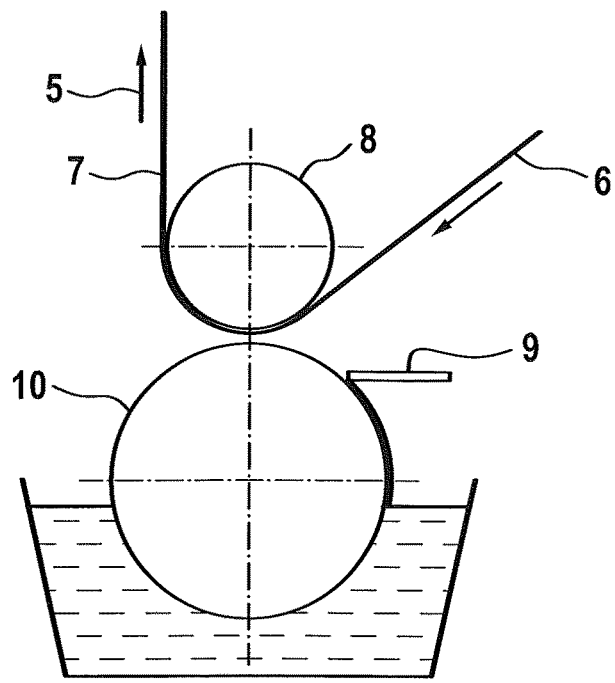
FIG. 5 is a schematic illustration of the structure and mode of operation of an exemplary conventional applicator unit used to apply the peel-coating composition to the base film.

FIG. 5 is a diagram of the structure and mode of operation of this type of conventional applicator unit. The diameter of the gravure roll (10) is by way of example from 400 to 600 mm, with a steel core on which a thin metallic layer has been applied, into which cells have been mechanically impressed. The appearance of the cells can differ—as required by the task to be undertaken. Typical cell geometries are round, square, having a honeycomb structure, and separate or connected. Once the cells have been impressed, the roll can finally be chromed. The technology depicted in FIG. 5 is termed forward gravure. Another possibility, of course, is "reverse gravure".

The peel-coating composition (corresponding to the outer layer (A) in liquid form) is applied by way of a trough to the applicator roll (10); a doctor (9) can be used by way of example to strip excess material; the coating is applied from the applicator roll to the biaxially oriented polyester film (6) (rubber roll (8), coated film (7), to dryer (5)). The process is therefore somewhat similar to printing.

For the production of the peel film of the invention it is important to achieve compliance with at least the two following criteria.

For production of a peel film with the desired optical properties, the temperature of the peel coating composition should be within certain limits. The temperature of the lacquer in the invention (measured in the trough and in the feed container) is from 10 to 40° C., preferably from 16 to 28° C. and particularly preferably from 18 to 25° C. If the temperature of the lacquer is below 10° C., cloud effects occur in the coated film, these being undesirable. If the temperature of the lacquer is above 40° C., the appearance of the coated film is non-uniform, and this is likewise undesirable.

Figure 6:
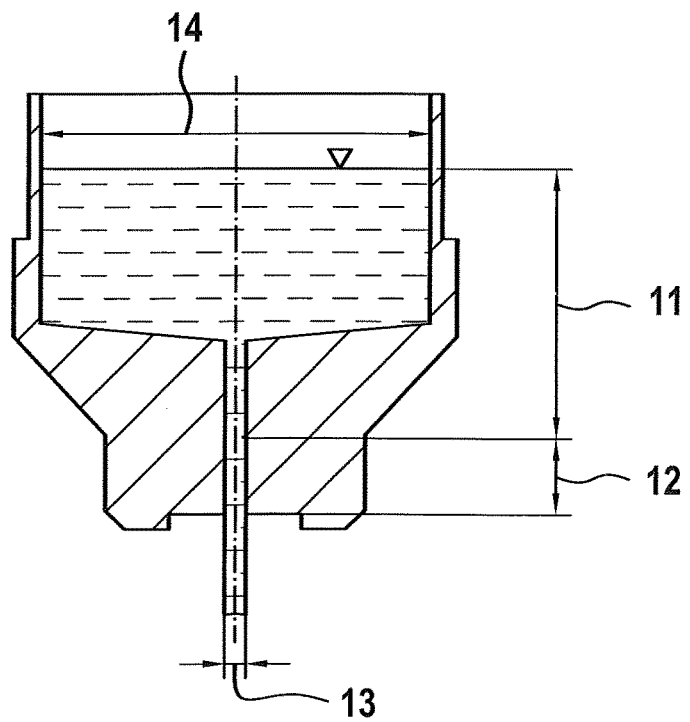
FIG. 6 is a schematic diagram of an exemplary flow cup that may be used to determine lacquer viscosity.

In order to achieve a peel film with high optical quality it is moreover necessary that the viscosity of the lacquer is within a defined range. The viscosity is determined by means of a flow cup in accordance with Zahn method No. 2. FIG. 6 is a diagram of a relevant flow cup ((14)=2R, (13)=2 $R_0$, (12)=L, (11)=$h_{(t)}$). The diameter of the flow cup (13) for Zahn method No. 2 is 2 mm.

The viscosity of the lacquer in the invention (measured in the trough and in the feed container) is from 10 to 50 s, preferably from 16 to 32 s and particularly preferably from 17 to 30 s. If the viscosity of the lacquer is less than 10 s, application is non-uniform, and this is discernible from large haze variations over the width and length of the film. These variations are, of course, undesirable, if the viscosity of the lacquer is greater than 50 s, the haze of the coated film is significantly higher, and this is likewise undesirable.

The peel film produced in the present invention has many advantageous properties of the invention, of which the most important are listed below.

The gloss of the film surface not coated offline with the polyester of the invention is greater than 100, in the preferred embodiment greater than 110 and in the particularly preferred embodiment greater than 120. The uncoated film surface is therefore in particular suitable for a further functional coating, for printing or for metallizing. The gloss of the film surface coated offline with the polyester of the invention is greater than 70, in the preferred embodiment greater than 75 and in the particularly preferred embodiment greater than 80.

The clarity of the film coated in the invention is greater than 80%. In a preferred embodiment the clarity of the film is more than 82% and in a particularly preferred embodiment it is more than 84%. The haze of the film coated in the invention is less than 20%. In a preferred embodiment the haze of the film is less than 18% and in a particularly preferred embodiment it is less than 15%. The transparency of the film coated in the invention is greater than 90. In a preferred embodiment, the transparency of the film is more than 90.5 and in a particularly preferred embodiment it is more than 91.

The peel properties of the film of the present invention are excellent. The film exhibits medium peel in relation to ready-meal trays made of APET and of RPET. Peel force in the temperature range from 110 to 160° C. is in the desired range from 3 to 7 N/15 mm. It has moreover surprisingly been found that the film of the invention also exhibits very good peeling in relation to ready-meal trays made of CPET and of ACPET and ready-meal trays made of paper board, where these have been covered with an APET layer; Here again, in all cases, the film exhibits the desired medium peel.

The film moreover has fully satisfactory "cold peel" behavior. It is moreover "reworkable", and this is highly advantageous for cost-effectiveness. The seal seam moreover exhibits high integrity, i.e. it is by way of example resistant to water and to olive oil and passes the "water and olive oil test".

Adhesion between the biaxially orientated polyester film and the outer layer (A) applied offline (intralayer bond strength) is high, and therefore when the film is peeled from the ready-meal tray the fracture preferentially takes place between peel layer and tray surface (adhesion fracture). This, of course, in particular improves "reworkability" and the appearance of the ready-meal tray after peeling.

The film of the invention has excellent suitability for the packing of foods and other consumable items, in particular in the packaging of foods and other consumable items in ready-meal trays where peelable polyester films are used for the opening of the packaging.

The table below (table 1) again collates the most important film properties of the invention.

cantly lower than 230° C., in the present case preferably below 200° C. and particularly preferably below 170° C.

The expression "peelable" means the property which is possessed by a polyester film which comprises at least one heat-sealable and peelable outer layer (A) and which, after heat-sealing on ready-meal trays made of APET/RPET and of CPET, can be peeled from the ready-meal tray in a manner which causes neither tearing nor break-off of the film. When the film is peeled from the ready-meal tray, the composite of heat-sealable film and tray is generally parted in the seam between the heat-sealable layer and the surface of the tray (cf. also Ahlhaus, O. E.: Verpackung mit Kunststoffen [Packaging with plastics], Carl Hanser Verlag, p. 271, 1997, ISBN 3-446-17711-6). When the film heat-sealed to a test strip of the ready-meal tray is peeled in a tensile strain tester at a peel angle of 180° in accordance with FIG. 1, the force-displacement behavior obtained for the film is as

TABLE 1

| | Advantageous range of the invention | Preferred | Particularly preferred | Unit | Test method |
|---|---|---|---|---|---|
| Outer layer (A) | | | | | |
| Proportion of polyester | from 85 to 99 | from 86 to 99 | from 87 to 99 | % by wt. | |
| Proportion of polyester units based on aromatic dicarboxylic acids | from 25 to 95 | from 40 to 90 | from 50 to 88 | mol % | |
| Proportion of polyester units based on aliphatic dicarboxylic acids | from 5 to 75 | from 10 to 60 | from 12 to 50 | mol % | |
| Proportion of other substances | from 1 to 15 | from 1 to 14 | from 1 to 13 | % by wt. | |
| Glass transition temperature of polyester | from 0 to 30 | from 0 to 3027 | from 2 to 25 | ° C. | internal |
| SV value of polyester | 200-2000 | 250-1900 | 300-1900 | | internal |
| Mass of dry outer layer (A) | 1-5 | 1.1-4.8 | 1.2-4.6 | g/m$^2$ | internal |
| Particle diameter d$_{90}$ | from 2.0 to 8 | from 2.5 to 7 | from 3.0 to 6 | µm | internal |
| Filler concentration | from 0.5 to 10 | from 0.7 to 8.0 | from 1.0 to 6.0 | % | internal |
| Properties | | | | | |
| Film thickness | from 3 to 200 | from 4 to 150 | from 5 to 100 | µm | |
| Minimum sealing temperature of OL (A) in relation to ready-meal trays made of APET and of RPET | 110 | 112 | 115 | ° C. | internal |
| Seal seam strength of OL (A) in relation to ready-meal trays made of APET and of RPET | from 3 to 7 | from 3.1 to 7 | from 3.2 to 7 | N/15 mm | internal |
| Cold peel behavior | medium peel | medium peel | medium/strong peel | | internal |
| Gloss of surface not coated offline | >100 | >110 | >120 | | DIN 67530 |
| Gloss of surface coated offline | >70 | >75 | >80 | | DIN 67530 |
| Clarity of film | >80 | >82 | >84 | % | ASTM D1003 |
| Haze of film | <20 | <18 | <15 | % | ASTM D1003-61 method A |
| Transparency of film | >90 | >90.5 | >91 | % | |
| Shrinkage of film | <2.5 | <2.2 | <2.0 | % | DIN 40634, 150° C., 15 min. |
| Modulus of elasticity of film | >3000 | >3500 | >4000 | | ISO 527-1 and ISO 527-3; sample type 2 |

Definitions

Figure 2:
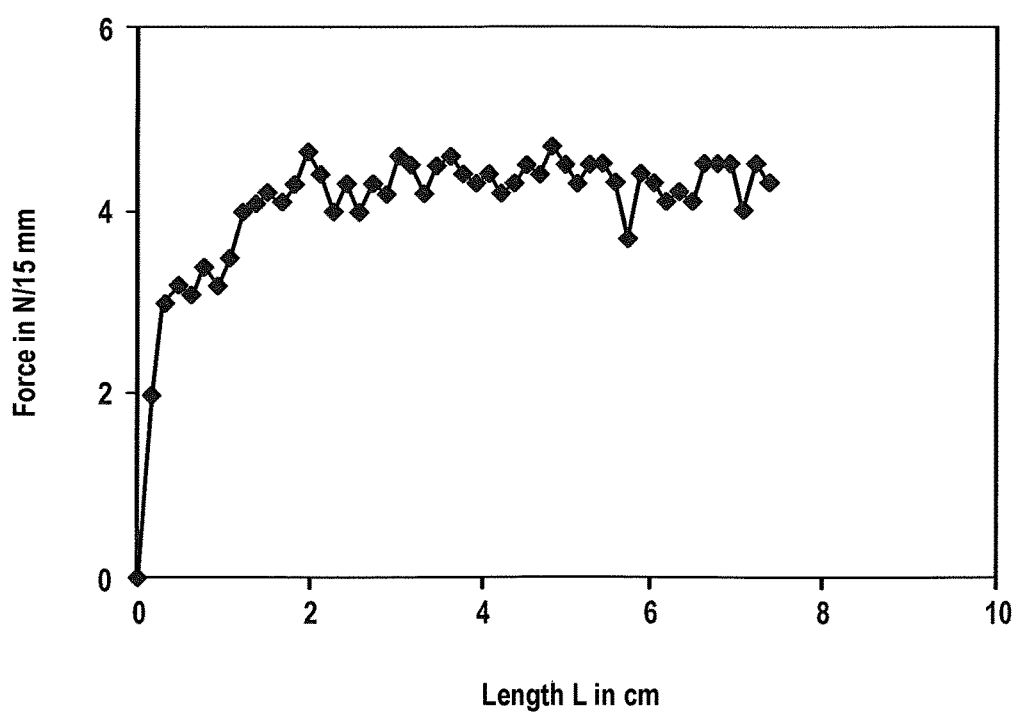
FIG. 2 is a graphical illustration of an exemplary peel force for a sample tested in accordance with FIG. 1.
Figure 3:
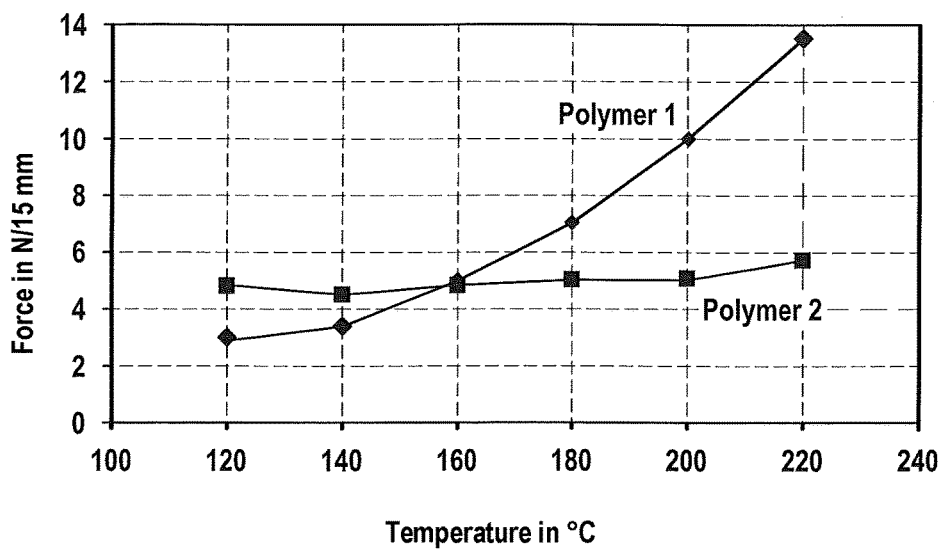
FIG. 3 is a graphical illustration of exemplary peel forces for various exemplary polymers used in the heat-sealable layer.

The expression "heat-sealable" means the property possessed by a multilayer polyester film which comprises at least one base layer (B) and which comprises at least one heat-sealable outer layer (A), and which can be bonded by means of sealing jaws via application of heat (from 110 to 200° C.) and pressure (from 1 to 6 bar) within a defined time (from 0.1 to 2 sec) to a substrate made of thermoplastic, in particular ready-meal trays made of APET/RPET and of CPET, while the supportive layer (=base layer B) does not itself become plastic. In order to achieve this, the melting point of the polymer of the scalable layer is generally significantly lower than that of the polymer of the base layer. If by way of example polyethylene terephthalate with melting point 254° C. is used as polymer for the base layer, the melting point of the heat-sealable layer is generally signifiin FIG. 2. When peeling of the film from the substrate starts, the force required for this purpose increases as in FIG. 2 up to a defined value (e.g. 5 N/15 mm), and then remains approximately constant over the entire peel distance, although with fluctuations of varying size (about +/−20%).

The expression "cold peel" means the property that is possessed by a polyester peel film which does not lose its predefined peelability after storage in refrigerator at conventional temperatures (from 2 to 8° C.). Cold peel behavior is usually tested as follows: the heat-sealed pack is placed in the refrigerator and kept there for about 15 min. The pack is removed from the refrigerator and then immediately the film is peeled manually from the ready-meal tray. It must peel completely here, i.e. during this procedure there must be no tearing or incipient tearing or tear-propagation in the film. The magnitude of the peel force here should correspond to "medium peel".

The expression "reworkability" means the property which is possessed by a polyester peel film which, after heat-sealing, can be peeled directly from the ready-meal tray with no resultant loss of its peelability. During production of the sealed pack it is likely that there will be some rejection of material, an example being a defective seal. The inspector on the line removes the defective ready-metal tray from the belt, and peels the peel film from the tray. The film has the "reworkable" property if it can fee peeled completely from the tray here, without any resultant incipient tearing. The ready-meal tray is then either reseated by using manual equipment or replaced in the line for sealing. The procedure takes place at the ambient temperature of the factory (from 4 to 10° C.).

Integrity in relation to water and olive oil. The film exhibits the desired integrity if it has passed the "water and olive oil test". In this test, before the ready-meal tray is heat-sealed a quantity of water or olive oil is placed therein and is sufficient to give a liquid layer of depth about 3 cm when the sealed ready-meal tray is placed vertically onto the seal seam. The film passes this test if no liquid has escaped after a storage time (vertically with 3 cm of liquid column acting on the seal layer) of at least 14 days.

The following test methods were used for the purposes of the present invention to characterize the raw materials and the films:

Seal Seam Strength (Peel Force Determination)

Seal seam strength is determined by placing a film strip (length 100 mm×width 15 mm) onto the internal side of a corresponding strip of the ready-meal tray made of APET/RPET (this strip being cut out from the base of the tray) and sealing said film strip with the temperature set to ≥110° C., with sealing time 0.5 s and "sealing pressure" 460 N (HSG/ET sealing equipment from Brugger, single-side-heated sealing jaw). In accordance with FIG. 2, after a time of about 2 h the sealed strips are clamped into the tensile tester (e.g. Zwick), and 180° seal seam strength is determined, i.e. the force required to separate the test strips, using a peel velocity of 200 mm/min. Seal seam strength is stated in N per 15 mm of film strip (e.g. 3 N/15 mm).

Determination of Minimal Sealing Temperature

HSG/ET sealing equipment from Brugger is used, as described previously for seal seam strength measurement, to produce heat-sealed samples (seal seam 15 mm×100 mm), the film being sealed at various temperatures with the aid of two heated sealing jaws with sealing pressure 460 N and sealing time 0.5 s. 180° seal seam strength was measured as in the determination of seal seam strength. The minimal sealing temperature is the temperature in ° C. at which a seal seam strength of at least 3 N/15 mm is achieved, where the minimal sealing temperature is always above 80° C.

Glass Transition Temperatures $T_g$

Glass transition temperature $T_g$ was determined on film samples with the aid of DSC (Differential Scanning Calorimetry). A DSC 1090 from Perkin-Elmer was used. Heating rate was 20 K/min, and input weight was about 12 mg. Thermal history was eliminated by first heating the samples to 300° C., holding for 5 minutes and then quenching with liquid nitrogen. The glass transition temperature $T_g$ was obtained from the thermogram as the temperature at half transition height.

Standard Viscosity SV

Standard viscosity in dilute solution SV was measured by a method based on DIN 53 728 part 3, in an Ubbelohde viscometer at (25±0.05)° C. Dichloroacetic acid (DCA) was used as solvent instead of a mixture of phenol and 1,2-dichlorobenzene. The concentration of the dissolved polymer was 1 g of polymer/100 ml of pure solvent. Dissolution of the polymer took one hour at 60° C. If the samples had not dissolved completely after this time, up to two further attempts at dissolution were made, in each case for ~10 minutes at 80° C., and the solutions were then centrifuged for 1 hour with rotation rate 4100 rpm.

The dimension less SV value is determined as follows from the relative viscosity ($\eta rel=\eta/\eta s$):

$$SV=(\eta rel-1)\times 1000$$

The particle content in the film or polymer was determined by ashing and correcting via appropriate increase of input weight. This means:

input weight=(input weight corresponding to 100% of polymer)/[(100 particle content % by wt.)/100)]

Haze, Clarity and Transparency

A HAZEGARD® XL-211 haze meter from BYK Gardner was used for measurement on the coated polyester films. Hölz haze was determined in accordance with ASTM D1003-61, method 1. Clarity was measured in accordance with ASTM D1003 by means of a HAZEGARD®, but now at the "clarity port" of the test equipment. Transparency is measured in accordance with ASTM D1033-77.

20° Gloss

Gloss is determined in accordance with DIN 67530. Reflectance is measured, this being an optical value characteristic of a film surface. Using a method based on the standards ASTM D523-78 and ISO 2813, the angle of incidence is set at 20°. A beam of light hits the flat test surface at the set angle of incidence and is reflected or scattered by the surface. A proportional electrical variable is displayed representing light rays incident on the photoelectronic detector. The value measured is dimensionless and must be stated with the angle of incidence.

Modulus of Elasticity

Modulus of elasticity is determined in accordance with ISO 527-1 and ISO 527-3, sample type 2, test velocity 100%/min, 23° C., 50% r.h.

Shrinkage

Shrinkage of the film is measured in accordance with DIN 40634 at temperature of 150° C. and with a shrinkage time of 15 min.

Antifogging Properties

For the determination of antifogging properties, the surface tension of the scalable side (A) is first, measured in mN/m 1 day after production of the peel film. Krüss DS 100 equipment is used for this in accordance with the operating instructions provided.

Determination of Anticondensation Effect

The anticondensation properties of the polyester films were determined as follows:

In a laboratory controlled to 23° C. and 50% relative humidity, film samples were welded to a ready-meal tray (length about 17 cm, width about 12 cm, depth about 3 cm) made of amorphous polyethylene terephthalate and comprising about 50 ml of water.

The trays are stored in a refrigerator controlled to 4° C., and removed for assessment after respectively 10 and 30 minutes and 4, 8 and 24 hours. Formation of condensate on cooling of the air from 23° C. to refrigerator temperature was tested. A film equipped with an effective anticondensation agent is transparent even after formation of condensate, because by way of example the condensate forms a coherent, transparent film. In the absence of an effective anticondensation agent, formation of a fine mist of droplets on the film surface reduces the transparency of the film; in the most disadvantageous case, the contents of the ready-meal tray become invisible.

Another test method is known as the hot fogging test. For this, a 250 ml glass beaker comprising 50 ml of water and covered by the film to be tested is placed in a water bath controlled to 70° C. The assessment method is the same as described above. This test can also be used to test the long-term anticondensation effect or wash-off-resistance of the film, because the vapor condenses continuously on the film and in turn runs off or drips off. Substances that are readily soluble are thus washed off, and the anticondensation effect decreases.

Measurement of Median Diameter $d_{50}$

A Malvern MASTERSIZER® 2000 is used to determine the median diameter $d_{50}$ of the particle to be used.

For this, the samples were placed in a cell with water, and this was then inserted into the test equipment. A laser was used to scan the dispersion, and particle size distribution was determined from the signal by comparison with a calibration carve. Two parameters characterize the particle size distribution: the median value $d_{50}$ (=a measure of the position of the central value) and the degree of scattering, known as SPAN98 (=measure of particle diameter scattering). The test procedure is automatic, and also includes mathematical determination of the $d_{50}$ value. The $d_{50}$ value here is defined as determined from the (relative) cumulative particle size distribution curve: the intersection of the 50% ordinate value with the cumulative carve provides the desired $d_{50}$ value on the abscissa axis.

Measurements on the film produced using these particles give a $d_{50}$ value lower by from 15 to 25% than that of the particle used.

Roughness

Roughness $R_a$ of the film is determined in accordance with DIN 4768 with a cutoff of 0.25 mm. Measurements here were made in a ring rather than on a glass plate. In the ring method, the film is clamped into a ring so that neither of the two surfaces is in contact with a third surface (e.g. glass).

The invention is explained in more detail below with reference to examples.

INVENTIVE EXAMPLE 1

I Production of the Biaxially Oriented Polyester Film

A biaxially oriented film made of polyethylene terephthalate with thickness 23 μm was produced by the conventional process (longitudinal-transverse orientation). For this, polyethylene terephthalate chips were fed to the extruder for the base layer (B"). Chips made of polyethylene terephthalate and particles were likewise fed to the extruder (twin-screw extruder) for the outer layer (B'). The raw materials were melted and homogenized in the two respective extruders in accordance with the process conditions listed in the table below.

The three melt streams for the layer (B") and the two outer layers (B') were then mutually superposed in layers by coextrusion in a three-layer die, and discharged by way of the die lip. The resultant melt film was cooled, and then a transparent, three-layer film with B'B"B' structure with total thickness 23 μm was produced by way of stepwise orientation in longitudinal and transverse direction. The thicknesses of the two outer layers (B') are respectively 1 μm.

Base layer (B"):
100% by weight of polyethylene terephthalate with SV value 800
Both outer layers (B') were a mixture of:
85% by weight of polyethylene terephthalate with SV value 790
15% by weight of Masterbatch made of 99% by weight of polyethylene terephthalate (SV value 790) and 1.0% by weight of SYLOBLOC® 44 H (synthetic SiO$_2$), $d_{50}$=2.5 μm The production conditions in the individual steps were:

| | | | | |
|---|---|---|---|---|
| Extrusion | Temperatures | Layer B' | 280 | ° C. |
| | | Layer B" | 280 | ° C. |
| | Take-off roll temperature | | 20 | ° C. |
| Longitudinal stretching (NTEP) | Heating temperature | | 70-120 | ° C. |
| | Stretching temperature | | 115 | ° C. |
| | Longitudinal stretching ratio (LOE = 1.7 and REP = 2.65) | | 4.5 | |
| Transverse stretching | Heating temperature | | 100 | ° C. |
| | Stretching temperature | | 135 | ° C. |
| | Transverse stretching ratio | | 4.0 | |
| Setting | Temperature | | 230 | ° C. |
| | Duration | | 3 | s |

II Production of the Coated Peel Film

The biaxially oriented polyester film was coated offline with a peel coating composition to form the outer layer (A) in accordance with the information below, using a gravure roll (forward gravure). Dry mass (=outer layer A) was 2.5 g/m².

Coating composition (cf. in this connection also table 2):
27.8% by weight of polyester (30 mol % of DMT units. 40 mol % of DMT units and 30 mol % of sebacate units and 44 mol % of EG, 56 mol % of neopentyl glycol).
0.2% by weight of SYLYSIA® 430 (synthetic SiO$_2$, Fuji, Japan) with particle diameter $d_{50}$=3.4 μm
2% by weight of antifogging agent, sodium diethyl sulfosuccinate (LUTENSIT® A-BO, BASF SE)
70% by weight of ethyl acetate The glass transition temperature of the polyester is 11° C., and the SV value of the polyester is 500. The viscosity of the lacquer was 25 s, measured in accordance with Zahn No. 2, and the temperature of the lacquer was 19.5° C.

Table 2 shows the respective proportions in mol % of the dicarboxylic acids and glycols present in the peel polymer, and also further information relating to the film of the invention.

Table 3 presents the properties of the film. Measurements show (column 2) that the minimal sealing temperature of the film in relation to ready-meal trays made of APET and of RPET is 120° C. The film was sealed in relation to ready-meal trays made of APET at 120, 130, 140 and 150° C. (sealing pressure 460 N, sealing time 0.5 s). Strips of the composite made of film of the invention and of ready-meal tray made of APET were then separated under tension in accordance with the abovementioned test specification in a tensile stress-strain tester. At all of the sealing temperatures, the films were found to peel in the desired manner from the tray, as in FIG. 2. The seal seam strengths measured are listed in column 3. Peelable films were obtained at all of the sealing temperatures; cold peel, behavior, which is important, was also fully satisfactory. The seal seam strengths are in the moderate range, being close to 5 N/15 mm, and this means that the films can be peeled from the ready-meal tray by exerting a controlled amount of force (=medium peel). The film moreover had the required good optical properties, and exhibited the desired handling and the desired processing behavior.

INVENTIVE EXAMPLE 2

In comparison with inventive example 1, dry mass of the scalable layer (A) was increased from 2.5 g/m² to 3.5 g/m² while film structure was otherwise identical and production method was otherwise identical. The minimal sealing temperature of the film in relation to ready-meal trays made of APET and of RPET is now 116° C. At all of the sealing temperatures, the films were found to peel in the desired manner from the tray, as in FIG. 2. The seal seam strengths measured are listed in column 3. At all of the sealing temperatures, peelable films were again obtained, i.e. films that were also cold-peelable. The seal seam strengths of the films of the invention are higher than in inventive example 1. However, they remain within a range where the film can be peeled from the tray without exerting substantial force. Haze measured on the film was somewhat higher; the handling of the film, and its processing performance, were as in inventive example 1. Although the peel film of this example is more expensive than the peel film of inventive example 1, it has the advantage that it can also be used to achieve a secure seal on ready-meal trays from Infia (with slight haze); these are difficult to seal.

INVENTIVE EXAMPLE 3

In comparison with inventive example 1, dry mass of the scalable layer (A) was increased from 3.5 g/m² to 4.5 g/m² while film structure was otherwise identical and production method was otherwise identical. The minimal sealing temperature of the film in relation to ready-meal trays made of APET and of RPET is now 116° C. At all of the sealing temperatures, the films were found to peel in the desired manner from the tray, as in FIG. 2. The seal seam strengths measured are listed in column 3. At all of the sealing temperatures, peelable films were again obtained, i.e. films that were also cold-peelable. The seal seam strengths of the films of the invention are significantly higher than in inventive example 1. Haze measured on the film was again somewhat higher; the handling of the film, and its processing performance, were as in inventive example 1. The peel film of this example has the advantage that it can also be used to seal ready-meal trays that are difficult to seal; these are encountered in particular among ready-meal trays made of RPET.

INVENTIVE EXAMPLE 4

In comparison with inventive example 1, the composition of the lacquer for the scalable outer layer (A) was changed, while film structure was otherwise identical. The lacquer is now comprised of the following proportions of raw materials:

27.8% by weight of polyester (45 mol % of DMT units, 32 mol % of DMI units, 1.0 mol % of sebacate units and 13 mol % of adipate units and 35 mol % of EG units, 25 mol % of DEG units, 15 mol % of PD units, 6 mol % of BD units and 19 mol % of neopentyl glycol units)

0.2% by weight of SYLYSIA® 430 (synthetic $SiO_2$, Fuji, Japan) with particle diameter $d_{50}$=3.4 μm 2% by weight of antifogging agent LUTENSIT® A-BO, BASF SE 70% by weight of ethyl acetate The minimal sealing temperature of the film in relation to ready-meal frays made of APET is now 113° C. At all of the sealing temperatures, the films were found to peel in the desired manner from the tray, as in FIG. 2. The seal seam strengths measured are listed in column 3. At all of the sealing temperatures, peelable films were again, obtained. The seal seam strengths of the films of the invention are higher than in inventive example 1. They are in a moderate range, and the film can therefore be peeled from the tray without exerting substantial force. The handling of the film, and its processing behavior, were as in inventive example 1.

COMPARATIVE EXAMPLE 1

In contrast to inventive example 1, example 1 of EP 1 475 228 B1 was repeated.

Table 3 presents the properties of the film. Although the film is highly pigmented and the pigments represent points of weakness in the scalable layer, a peelable film was not obtained at any of the stated sealing temperatures. When the film is peeled from the ready-meal tray, incipient tearing occurred immediately, and the film failed to exhibit a force-displacement graph as in FIG. 2. The film exhibits "weldable" behavior, and is therefore unsuitable for achieving the object mentioned.

TABLE 2

| | | Composition of polyester for outer layer (A) | | | | | | | | | | Glass transition temperature of polyester °C. |
|---|---|---|---|---|---|---|---|---|---|---|---|---|
| | | Dicarboxylic acids | | | | | Diets | | | | | |
| | | | | | | | | 1,2- | | | | |
| | | DMT | DMI | AzS mol % | ScS | AdS | EG | DEG | PD mol % | BD | NG | |
| Inventive examples | 1 | 30 | 40 | | 30 | | 44 | | | | 56 | 11 |
| | 2 | 30 | 40 | | 30 | | 44 | | | | 56 | 11 |
| | 3 | 30 | 40 | | 30 | | 44 | | | | 56 | 11 |
| | 4 | 45 | 32 | 10 | | 13 | 35 | 25 | 15 | 7 | 18 | 12 |
| Comparative examples | 1 | | | | | | | | | | | 75 |

| | | SV value of polyester | Film structure | Approximate film thickness μm | Mass of outer layer (A) g/m² | Antifogging agent and concentration in layer (A) | Particles in B' of biaxially oriented polyester film | |
|---|---|---|---|---|---|---|---|---|
| | | | | | | | Diameter μm | Concentration % by wt. |
| Inventive examples | 1 | 500 | AB | 25 | 2.5 | Lutensit A-BO BASF SE/2 | 3.4 | 0.20 |
| | 2 | 500 | AB | 25 | 3.5 | Lutensit A-BO BASF SE/2 | 3.4 | 0.20 |
| | 3 | 500 | AB | 25 | 4.5 | Lutensit A-BO BASF SE/2 | 3.4 | 0.20 |
| | 4 | 500 | AB | 25 | 2.5 | Lutensit A-BO BASF SE/2 | 3.4 | 0.20 |
| Comparative examples | 1 | | ABC | 25 | 1 | | 3.4 | 5 |

As used herein, DMT = dimethyl terephthalate, DMI = dimethyl isophthalate, EG = ethanediol, DEG = diethylene glycol, PD = propanediol, BD = butanediol, NG = neopentyl glycol AzS = azelate, SeS = sebacate, AdS = adipate

TABLE 3

| | | Minimal sealing temperature °C. | Seal seam strength in relation to ready-meal trays amde of APET at temperature in ° C. | | | | Cold peel and reworkability | Haze % | Clarity % | Gloss | |
|---|---|---|---|---|---|---|---|---|---|---|---|
| | | | 120 | 130 | 140 | 150 | | | | Side A | Side B |
| | | | N/15 mm | | | | | | | | |
| Inventive examples | 1 | 120 | 4.2 | 4.7 | 5.2 | 4.8 | ++++ | 11 | 92 | 75 | 130 |
| | 2 | 116 | 4.9 | 5.7 | 6.8 | 5.8 | ++++ | 12 | 91 | 74 | 130 |
| | 3 | 111 | 6.4 | 6.5 | 6.9 | 6.2 | ++++ | 13 | 58 | 73 | 130 |
| | 4 | 113 | | 5.2 | 5.7 | 5.6 | ++++ | 10 | 91 | 79 | 130 |
| | 5 | | | | | | | | | | |
| Comparative examples | 1 | 130 | 1.7 | 2.5 | 5 | 8 | ~ | 23 | 85 | 55 | 130 |
| | 2 | | | | | | | | | | |

| | | Transparency % | Roughness values | | Modulus of elasticity N/mm² | Shrinkage % | Antifogging behavior | Water and olive oil test |
|---|---|---|---|---|---|---|---|---|
| | | | Side A | Side B μm | | | | |
| Inventive examples | 1 | 90.5 | 259 | 60 | 4500 | 2.1 | good, passed | passed |
| | 2 | 90.2 | 270 | 60 | 4300 | 2.1 | good, passed | passed |
| | 3 | 90.1 | 279 | 60 | 4200 | 2 | good, passed | passed |
| | 4 | 90.8 | 233 | 60 | 4600 | 2.1 | good, passed | passed |
| | 5 | | | | | | | |
| Comparative examples | 1 | | 310 | 60 | | | | |
| | 2 | | | | | | | |

Cold peel ++++ At all of the sealing temperatures, film is "peeled" from the ready-meal tray with no resistant incipient tearing in, or tear-propagation in, the film. Peeling of the film from the tray is complete, clean and fully satisfactory, even in the upper temperature range with high sealing seam strength (medium peel).
^ At all of the sealing temperatures, incipient tearing of the film occurs on peeling from the tray That which is claimed:

1. A transparent, peelable polyester film with clarity greater than 80%, comprising a biaxially oriented polyester film base layer (B) and, coated offline onto this, a heat-sealable outer layer (A) that is peelable in relation to ready-meal trays made of amorphous, transparent polyethylene terephthalate (APET) and of regrind polyethylene terephthalate (RPET),
where the heat-sealable and peelable outer layer (A) comprises:
a) from 85 to 99% by weight of polyester as a peel polymer and
b) from 1 to 15% by weight of other substances, wherein
c) the polyester is comprised of from 25 to 95 mol % of units derived from at least one aromatic dicarboxylic acid and from 5 to 75 mol % of units derived from at least one aliphatic dicarboxylic acid, where the sum of the dicarboxylic-acid-derived molar percentages is 100;
d) the polyester is comprised of at least 10 mol % of units derived from diols having more than 2 carbon atoms, where the sum of the glycol-derived molar percentages is 100;
e) the mass of the dry outer layer (A) is from 1 to 5 g/m$^2$; and
f) the film has a minimal sealing temperature in relation to ready-meal trays formed of APET and of RPET of not more than 115° C.

2. The polyester film as claimed in claim 1, wherein the other substances of the outer layer (A) are selected from the group consisting of: particles, additives, auxiliaries, lubricant, antifogging agent and mixtures thereof.

3. The polyester film as claimed in claim 1, wherein the film has a minimal sealing temperature in relation to ready-meal trays made of APET and made of RPET of not more than 110° C., the film has a maximal sealing temperature of about 160° C., and the film has a seal seam strength or peel force in relation to ready-meal trays made of APET and of RPET of at least 3.0 N.

4. The polyester film as claimed in claim 1, wherein the following formula relates the peel force F in relation to ready-meal trays made of APET and of RPET to the sealing temperature $\partial$ (in ° C.):

$$0.018 \cdot \partial/° C. +1.5 \leq \text{peel force } F/N \text{ per 15 mm} \leq 0.03 \cdot \partial/° C. +2.5.$$

5. The polyester film as claimed in claim 4, wherein the following formula relates the peel force F in relation to ready-meal trays made of APET and of RPET to the sealing temperature $\partial$ (in ° C.):

$$0.018 \cdot \partial/° C. +1.0 \leq \text{peel force } F/N \text{ per 15 mm} \leq 0.03 \cdot \partial/° C. +2.5.$$

6. The polyester film as claimed in claim 1, wherein the peelable polyester of the outer layer (A) comprises the following dicarboxylic-acid-derived units and diol-derived units, based in each case on the entire quantity of dicarboxylic-acid-based and, respectively, diol-based repeat units:
from 25 to 85 mol % of terephthalate,
from 5 to 50 mol % of isophthalate,
from 5 to 50 mol % of adipate,
0 mol % of azelate,
from 5 to 50 mol % of sebacate,
more than 10 mol % of ethylene glycol more than 10 mol % of one or more diols selected from the group consisting of: $C_3$ to $C_7$-diols, di-, tri- and tetra-$C_2$ to $C_4$-alkylene glycols,
and the film has a seal seam strength or peel force in relation to ready-meal trays made of APET and of RPET of at least 3.0 N/15 mm.

7. The polyester film as claimed in claim 1, wherein the polyester of the peelable outer layer (A) has a glass transition temperature of from 0 to 30° C.

8. The polyester film as claimed in claim 1, wherein the polyester of the peelable outer layer (A) has an SV value of from 200 to 2000.

9. The polyester film as claimed in claim 1, wherein the outer layer (A) comprises one or more anionic surfactants as antifogging agents in a total concentration of from 0.01 to 5% by weight, and further includes terephthalate, isophthalate, and aliphatic dicarboxylic acid consisting of sebacate and optional adipate, and the film has a seal seam strength or peel force in relation to ready-meal trays made of APET and of RPET of at least 3.0 N/15 mm.

10. The polyester film as claimed in claim 1, wherein the base layer (B) has a three layered structure with the same outer layers, B'B"B', or differing outer layers, B'B"B'".

11. The polyester film as claimed in claim 1, wherein the peelable polyester film has a total thickness of from 3 to 200 µm and the base layer (B) provides a proportion of from 45 to 97% of the total thickness.

12. A process for the production of a polyester film as claimed in claim 1, comprising
melting the polymer for the base layer (B) or the polymers for the individual layers B', B" and B'" or B', B" and B' of the base layer in one or more extruders,
shaping same in a single-layer die or coextrusion die to give a flat melt film, which is then drawn off and hardened with the aid of a chill roll and optionally other rolls, biaxially stretched, heat-set and rolled up, and
applying a peel-coating composition in liquid form to the base film offline by means of coating technology, and drying said composition, and
winding the offline-coated film up,
wherein the peelable outer layer (A) is comprises from 85 to 99% by weight of polyester and from 1 to 15% by weight of other substances,
where the polyester comprises from 25 to 95 mol % of units derived from at least one aromatic dicarboxylic acid and from 5 to 75 mol % of units derived from at least one aliphatic dicarboxylic acid, where the sum of the dicarboxylic-acid-derived molar percentages is 100 and the polyester is comprised of at least 10 mol % of units derived from diols having more than 2 carbon atoms, where the sum of the glycol-derived molar percentages is 100 and the mass of the dry outer layer (A) is from 1 to 5 g/m$^2$ wherein the film has a minimal sealing temperature in relation to ready-meal trays formed of APET and of RPET of not more than 115° C.

13. The process as claimed in claim 12, wherein the temperature of the peel-coating composition, measured in the trough and in the feed container, is from 10 to 40° C.

14. The process as claimed in claim 12, wherein the peel-coating composition has a viscosity—measured in the trough and in the feed container by means of flow cup in accordance with the Zahn method No. 2—of from 10 to 50 s.

15. Sealable film comprising a polyester film as claimed in claim 1.

16. Ready-meal trays made of APET and/or of RPET comprising sealable film as claimed in claim 15.

17. The polyester film as claimed in claim 1, wherein the heat-sealable and peelable outer layer (A) consists of:
   a) from 85 to 99% by weight of polyester and
   b) from 1 to 15% by weight of other substances consisting of inorganic particles, organic particles, lubricants, and/or antifogging agents.

18. The polyester film as claimed in claim 1, wherein the peel polymer consists of polyester comprising from 25 to 85 mol % of terephthalate, from 5 to 50 mol % of isophthalate and aliphatic dicarboxylic acid consisting of from 5 to 50 mol % of sebacate and optionally from 5 to 50 mol % of sebacate,
   the heat-sealable and peelable outer layer (A) comprises antifogging agent, and
   the film has a seal seam strength or peel force in relation to ready-meal trays made of APET and of RPET of at least 3.7 N/15 mm.

19. The polyester film as claimed in claim 9, wherein said film exhibits a shrinkage of less than 2.5% at 150° C. for 15 minutes, measured per DIN 40634.

20. The polyester film as claimed in claim 1, wherein the mass of the dry outer layer (A) is from 3.5 to 5 g/m$^2$.

21. The polyester film as claimed in claim 1, wherein the film has a minimal sealing temperature of not more than 110° C.

22. The polyester film as claimed in claim 6, wherein the diol is neopentyl glycol and the film has a seal seam strength or peel force in relation to ready-meal trays made of APET and of RPET of at least 3.2 N.

* * * * *

UNITED STATES PATENT AND TRADEMARK OFFICE
CERTIFICATE OF CORRECTION

PATENT NO. : 10,843,447 B2
APPLICATION NO. : 15/595836
DATED : November 24, 2020
INVENTOR(S) : Peiffer et al.

Page 1 of 1

It is certified that error appears in the above-identified patent and that said Letters Patent is hereby corrected as shown below:

On the Title Page

Item [57], Abstract
Final line, delete "scalable" insert --sealable--

In the Claims

Claim 6
Column 29, Line 64, begin new indented line after --more than 10 mol % of ethylene glycol--

Signed and Sealed this
Ninth Day of March, 2021

Drew Hirshfeld
*Performing the Functions and Duties of the*
*Under Secretary of Commerce for Intellectual Property and*
*Director of the United States Patent and Trademark Office*